United States Patent Office 2,940,206
Patented June 14, 1960

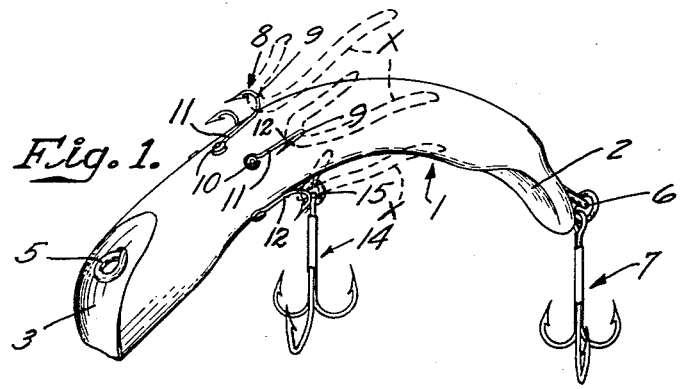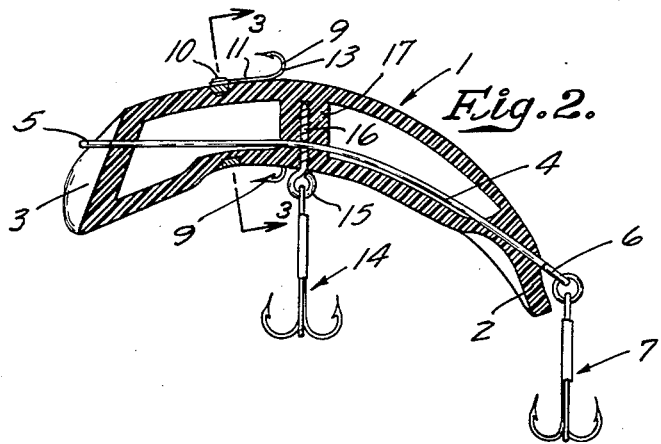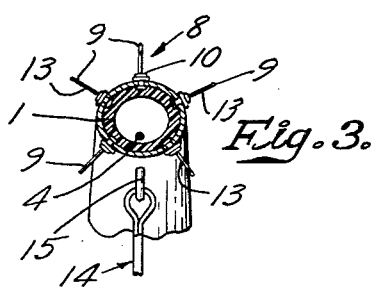

2,940,206

FISH LURE

Roland E. Agnew, 11 E. 17th St., Minneapolis 3, Minn.

Filed Jan. 2, 1958, Ser. No. 706,637

1 Claim. (Cl. 43—42.35)

My invention relates to improvements in artificial fish lures and more specifically to hollow buoyant fish lures of the type formed from suitable tough plastic material.

The primary object of my invention is the provision of a fish lure of the class immediately above described which includes a longitudinally curved body, said body being cross-sectionally generally circular and having a flattened rear end portion and a forwardly concave front end portion, a hook secured to the flattened end portion of said body for universal swinging movements, a line attaching loop projecting forwardly from said concave front end portion, and a circumferential row of spaced forwardly opening hooks secured to the intermediate portion of said body with the hooked end portions projecting radially outwardly from the intermediate portion of the body for the reception thereon of edible bait such as pork rind, night crawlers or the like.

A further object of my invention is the provision of a device of the class described in which a hook is secured to the lower surface of said body immediately rearwardly of said row of hooks for universal swinging movements.

A further object of my invention is the provision of a device of the class above described in which a drawrod extends generally axially through said longitudinally curved body, said drawrod terminating at its forward end in a line attaching loop within said concave front end portion, the rear end of said drawrod terminating in said flattened rear end portion in a loop for the reception of said first-mentioned hook.

A further object of my invention is the provision of a device of the class above described which is highly efficient in its operation and which is relatively inexpensive to produce.

The above and still further objects of my invention will become apparent from the following detailed specification, appended claim and attached drawings.

Referring to the drawings wherein like characters indicate like parts throughout the several views:

Fig. 1 is a view in perspective of my novel lure;

Fig. 2 is a view partly in side elevation and partly in axial section; and

Fig. 3 is a view in transverse section taken on the line 3—3 of Fig. 2.

Referring with greater particularity to the drawings, the numeral 1 indicates in its entirety an elongated arcuate body preferably and as shown being hollow or tubular in form and formed from any suitable relatively tough plastic material. As shown, the rear end portion of the body 1 is flattened as at 2 to provide a tail portion tending to cause the rear end of the bait to rise. On the other hand, the body 1 is formed to provide a forwardly concave front end portion 3 which tends to cause the body 1 to dive.

Extending longitudinally through the body 1 is a drawrod 4 which terminates at its forward end in a line attaching loop 5 within the concave front end portion 3. At its rear end the drawrod 4 terminates in a loop 6 within the flattened rear end portion 2 of the body 1. Secured to the loop 6 for universal swinging movements is a fish hook 7, shown as being of the gang type.

As above indicated, an important feature of my invention resides in the securing to the intermediate portion of the body 1 a circumferential row 8 of spaced forwardly opening hooks 9. Hooks 9 are of a conventional nature and are secured to the body 1 by means of screws or the like 10 which pass through the loop-forming forward end portions 11 of the shanks 12, the shanks 12 being maintained in engagement with the outer peripheral surface of the body 1 while the hook portions 13 thereof project radially outwardly from the axis of the body 1. The row 8 of hooks 9 are adapted to receive edible bait X formed from pork rind, earth worms such as night crawlers and the like.

Preferably and as shown, a hook 14, also preferably of the gang type, is secured to the body 1, immediately rearwardly of the row 8 for universal swinging movements, through the medium of an eye 15 depending from a screw or the like 16 suitably anchored in a transverse webbing 17 in the hollow body 1.

When a fish line is attached to the looped forward end 5 of the drawrod 4 and the body is drawn through the water, my novel bait follows an undulating course in a substantially vertical plane due to the combination of elements above described and has proven to be an extremely satisfactory lure, and while I have shown a preferred embodiment of my invention, I wish it to be specifically understood that same is capable of modification without departure from the scope and spirit of the appended claim.

What I claim is:

A fish lure comprising an elongated longitudinally curved tubular body formed from tough plastic material, said body being cross-sectionally generally circular and having a flattened rear end portion and a forwardly concave front end portion, transverse webbing dividing said body into forward and rearward compartments, a drawrod extending longitudinally through said body and having its intermediate portion anchored in said webbing, the front end portion of said drawrod being formed to provide a line attaching loop, whereas the rear end portion thereof is formed to provide a fish hook receiving loop, a hook secured to said body and the webbing thereof and depending therefrom for free swinging movements, and a circumferential row of spaced forwardly opening hooks secured rigidly to said body intermediate said concave front end portion and said webbing.

References Cited in the file of this patent

UNITED STATES PATENTS

| 841,429 | Passage | Jan. 15, 1907 |
| 1,393,617 | Frame | Oct. 11, 1921 |
| 2,121,474 | Bowering | June 21, 1938 |
| 2,214,360 | Woodley | Sept. 10, 1940 |
| 2,522,179 | Jensen | Sept. 12, 1950 |

FOREIGN PATENTS

| 523,103 | Canada | Mar. 27, 1956 |